(12) United States Patent
Shi

(10) Patent No.: US 11,204,197 B2
(45) Date of Patent: Dec. 21, 2021

(54) TEMPERATURE-ADJUSTABLE FOUR-EFFECT DEHUMIDIFYING AND DRYING SYSTEM

(71) Applicant: Guangzhou Shincci Energy Equipment Co., Ltd, Guangdong (CN)

(72) Inventor: Zengkuang Shi, Guangdong (CN)

( * ) Notice: Subject to any disclaimer, the term of this patent is extended or adjusted under 35 U.S.C. 154(b) by 340 days.

(21) Appl. No.: 16/465,153

(22) PCT Filed: Dec. 25, 2017

(86) PCT No.: PCT/CN2017/118409
§ 371 (c)(1),
(2) Date: May 30, 2019

(87) PCT Pub. No.: WO2018/121488
PCT Pub. Date: Jul. 5, 2018

(65) Prior Publication Data
US 2019/0390907 A1 Dec. 26, 2019

(30) Foreign Application Priority Data

Dec. 29, 2016 (CN) .......................... 201611243381.1

(51) Int. Cl.
*F26B 21/08* (2006.01)
*F26B 21/04* (2006.01)
*F26B 21/12* (2006.01)

(52) U.S. Cl.
CPC ............ *F26B 21/086* (2013.01); *F26B 21/04* (2013.01); *F26B 21/12* (2013.01); *F26B 2200/18* (2013.01)

(58) Field of Classification Search
CPC ........ F26B 21/04; F26B 21/12; F26B 21/086; F26B 23/005; F26B 2200/18; F26B 21/02; F26B 2313/0212; F26B 2313/02333; Y02P 70/10; Y02B 30/52; F24F 3/147; F24F 3/1405; F24F 2003/1452;
(Continued)

(56) References Cited

U.S. PATENT DOCUMENTS 2,619,812 A * 12/1952 Burgess .................. F25B 13/00
62/90
3,931,683 A * 1/1976 Crites .................... F26B 21/086
34/169
(Continued)

FOREIGN PATENT DOCUMENTS

CN 202973357 U * 6/2013
EP 1821042 A2 * 8/2007 ............ F24F 12/006
(Continued)

*Primary Examiner* — Jorge A Pereiro
*Assistant Examiner* — Bao D Nguyen
(74) *Attorney, Agent, or Firm* — Prakash Nama; Global IP Services, PLLC

(57) ABSTRACT

A temperature-adjustable four-effect dehumidifying and drying system, having at least two sets of dehumidification heat pump assemblies and a set of auxiliary heat exchange assembly, wherein the dehumidification heat pump assemblies have at least two refrigerant modules and an air module, the auxiliary heat exchange assembly is formed by connecting at least two heat exchangers (4, 12) in series by means of a circulation pipeline, and the circulation pipeline is provided with a refrigerant inlet and a refrigerant outlet.

10 Claims, 5 Drawing Sheets

(58) Field of Classification Search
CPC ......... F24F 2003/1458; F24F 2003/144; F24F 1/0358; F24F 1/0083; F24F 2203/021; F24F 3/14
USPC .................................................................. 34/77
See application file for complete search history.

(56) References Cited

U.S. PATENT DOCUMENTS

| | | | | |
|---|---|---|---|---|
| 4,426,791 | A * | 1/1984 | Coppa | F26B 21/086 34/515 |
| 4,761,966 | A * | 8/1988 | Stark | F24F 3/1405 236/44 C |
| 4,827,733 | A * | 5/1989 | Dinh | F24F 6/02 62/305 |
| 4,938,035 | A * | 7/1990 | Dinh | F24F 6/02 62/279 |
| 5,309,725 | A * | 5/1994 | Cayce | F24F 3/153 62/90 |
| 5,953,926 | A * | 9/1999 | Dressier | F24F 3/147 62/175 |
| 6,038,879 | A * | 3/2000 | Turcotte | F24F 12/003 62/325 |
| 6,199,389 | B1 * | 3/2001 | Maeda | F24F 3/1411 62/94 |
| 6,205,797 | B1 * | 3/2001 | Maeda | F24F 3/1411 62/175 |
| 6,209,223 | B1 * | 4/2001 | Dinh | F26B 21/001 34/86 |
| 6,311,511 | B1 * | 11/2001 | Maeda | F24F 3/1411 62/271 |
| 6,324,860 | B1 * | 12/2001 | Maeda | F24F 3/1423 62/271 |
| 6,442,951 | B1 * | 9/2002 | Maeda | F24F 3/1423 62/271 |
| 7,325,333 | B2 * | 2/2008 | Tadano | D06F 34/14 34/604 |
| 8,266,824 | B2 * | 9/2012 | Steiner | D06F 58/206 34/595 |
| 8,316,660 | B2 * | 11/2012 | DeMonte | F24F 12/006 62/272 |
| 8,347,640 | B2 * | 1/2013 | DeMonte | F24F 1/04 62/93 |
| 9,212,450 | B2 * | 12/2015 | Grunert | D06F 58/206 |
| 10,240,276 | B2 * | 3/2019 | Ryoo | D06F 58/206 |
| 10,782,045 | B2 * | 9/2020 | LePoudre | F24F 3/1411 |
| 2002/0038521 | A1 * | 4/2002 | Speck | B05D 3/0406 34/474 |
| 2003/0121276 | A1 * | 7/2003 | Maeda | F24F 3/1423 62/271 |
| 2004/0134211 | A1 * | 7/2004 | Lee | F24F 12/003 62/271 |
| 2005/0066538 | A1 * | 3/2005 | Goldberg | D06F 34/26 34/218 |
| 2005/0199016 | A1 * | 9/2005 | Tadano | D06F 43/007 68/18 C |
| 2006/0218949 | A1 * | 10/2006 | Ellis | F24F 3/153 62/173 |
| 2008/0216341 | A1 * | 9/2008 | Mukaiyama | D06F 58/206 34/124 |
| 2010/0154248 | A1 * | 6/2010 | Stolze | D06F 58/38 34/493 |
| 2010/0242507 | A1 * | 9/2010 | Meckler | F25B 40/00 62/94 |
| 2010/0307018 | A1 * | 12/2010 | Driussi | D06F 58/206 34/79 |
| 2011/0277334 | A1 * | 11/2011 | Lee | D06F 58/206 34/73 |
| 2011/0280736 | A1 * | 11/2011 | Lee | F04B 49/03 417/26 |
| 2012/0085112 | A1 * | 4/2012 | Wintemute | F25B 49/02 62/150 |
| 2013/0047662 | A1 * | 2/2013 | Black | F24F 1/04 62/498 |
| 2014/0069134 | A1 * | 3/2014 | Grabon | F24F 3/1405 62/305 |
| 2015/0204586 | A1 * | 7/2015 | Burg | F25B 41/20 62/324.6 |
| 2016/0186374 | A1 * | 6/2016 | Ryoo | D06F 58/206 34/86 |
| 2017/0146293 | A1 * | 5/2017 | Nakahama | B01D 53/002 |
| 2017/0356661 | A1 * | 12/2017 | Fischer | F24F 3/147 |
| 2018/0296973 | A1 * | 10/2018 | Ito | F25B 30/02 |
| 2018/0306462 | A1 * | 10/2018 | Ito | F24F 13/30 |
| 2020/0061522 | A1 * | 2/2020 | Lilly | F24F 12/006 |

FOREIGN PATENT DOCUMENTS

| | | | | |
|---|---|---|---|---|
| FR | 2672970 A1 * | 8/1992 | ......... | F28D 15/0266 |
| WO | WO-2004029516 A1 * | 4/2004 | ............. | F24F 3/153 |
| WO | WO-2009106150 A1 * | 9/2009 | ........... | D06F 58/206 |

* cited by examiner

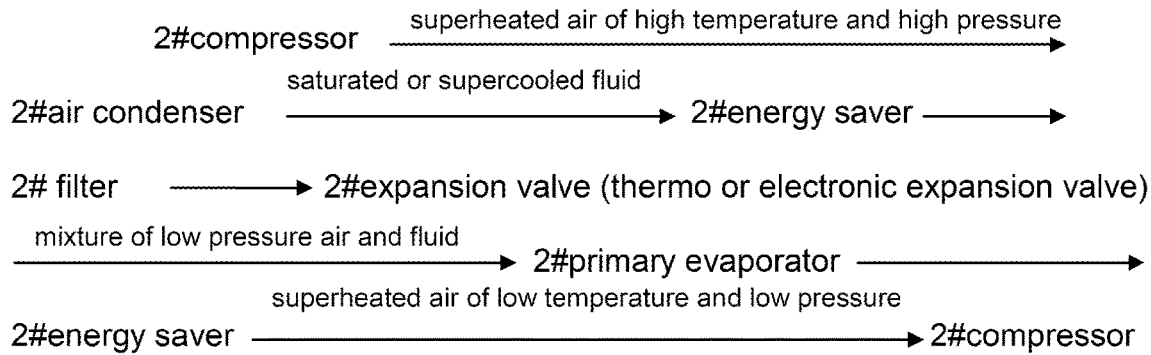
FIG. 6
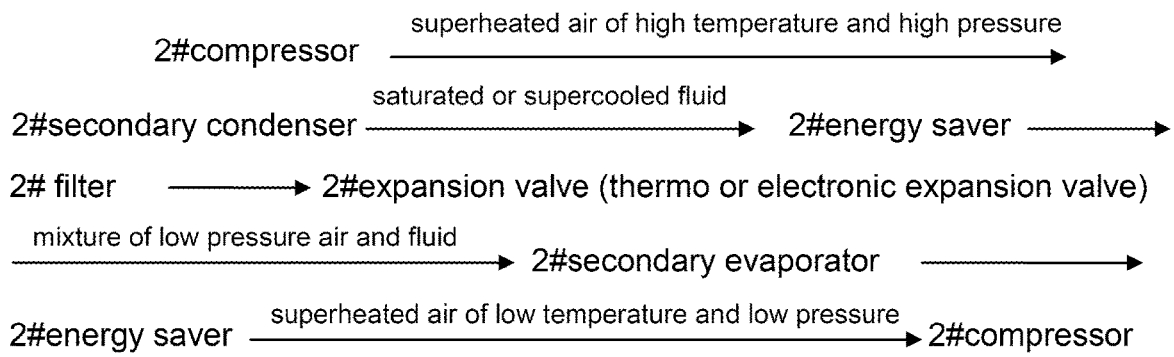
FIG. 7
Cooling source (e.g. cooling tower) → cooling water → cooling water pipe → electric proportional valve → surface cooler → cooling water discharge pipe →cooling source
FIG. 8

TEMPERATURE-ADJUSTABLE FOUR-EFFECT DEHUMIDIFYING AND DRYING SYSTEM

BACKGROUND OF THE INVENTION

The present invention relates to the technical field of drying apparatus, and more specifically relates to a temperature-adjustable four-effect dehumidifying and drying system.

Nowadays, a commonly used drying system for sludge is operated mainly by means of a rotating drum that achieves direct drying, multiple platforms, a rotating disc or a fluidized bed. Yet, belt drying has now received greater attention and has a very good potential for growth in the market due to its strong adaptability to wet sludge, lesser parts that have to be maintained, longer service life and lower drying temperature. Belt drying of sludge that makes use of heat pump dehumidification together with mesh belt sludge drying has become a new trend in the market due to its great advantages on energy conservation and environmental friendliness etc. Heat pump dehumidification in sludge drying technology is going to dominate belt drying of sludge.

However, dehumidification by making use of a current drying apparatus equipped with dehumidifying heat pumps is affected by operating conditions, wherein cooling by means of external air or cooling water is required to achieve temperature adjustment during the drying process, and thus achieving only a small range of temperature adjustment and a small volume of water being dehumidified, also, there are leakage of hot air and also bad smells that affect the peripheral environment if cooling is achieved by external air; besides, different requirements for air volume at different drying stages during the drying process of the sludge cannot be met, and different requirements for temperature and humidity at different drying stages during the drying process of the sludge cannot be met; further, the drying temperature cannot be automatically adjusted, and drying under lower temperature conditions (low temperature drying) cannot be achieved; the volume of circulation air is small and the drying cycle is long when it comes to sludge that has higher water content; lastly, the prior art fails to meet the requirements for a modular structure due to occupation of large floor space and also a large space required for maintenance.

BRIEF SUMMARY OF THE INVENTION

In view of the aforesaid disadvantages now present in the prior art, the present invention provides a temperature-adjustable four-effect dehumidifying and drying system that is highly efficient, structurally compact, free of leakage of bad smells, occupies small floor spaces, and has a short processing cycle, and which also does not require cooling by means of external air or other cooling sources.

The objects of the present invention are achieved as follows:

A temperature-adjustable four-effect dehumidifying and drying system, comprising at least two sets of dehumidifying heat pump assemblies and a set of auxiliary heat exchange assembly; the at least two sets of dehumidifying heat pump assemblies comprise at least two refrigerant modules and an air module; each of the refrigerant modules comprises condensers, evaporators, and compressors; an outlet of each compressor is connected to an inlet of a corresponding condenser, an outlet of the corresponding condenser is connected to an inlet of a corresponding evaporator via a corresponding expansion valve, and an outlet of the corresponding evaporator is connected to said compressor; the auxiliary heat exchange assembly is formed by at least two heat exchangers connected via pipes defining a circulation loop; the air module comprises an air inlet pipe and a regenerator for each of the at least two refrigerant modules; in each refrigerant module, the corresponding air inlet pipe is connected to a hot side of the corresponding regenerator through a corresponding heat exchanger of the auxiliary heat exchange assembly, the hot side of the corresponding regenerator is connected with the evaporators of the corresponding refrigerant module via ventilation ducts, and the evaporators of the corresponding refrigerant module are also connected to a cold side of the corresponding regenerator via ventilation ducts; the cold side of the corresponding regenerator is also connected with a secondary condenser of the condensers of the corresponding refrigerant module via ventilation ducts; air coming out of the secondary condenser of the condensers of the corresponding refrigerant module is guided to a respective air outlet port.

The dehumidifying heat pump assemblies comprise two refrigerant modules and the air module, each of the two refrigerant modules comprises a primary refrigeration module and a secondary refrigeration module; the primary refrigeration module comprises a primary condenser, a primary evaporator and a compressor; an outlet of the compressor is connected to an inlet of the primary condenser, and an outlet of the primary condenser is connected to an inlet of the primary evaporator through an expansion valve; and an outlet of the primary evaporator is connected to an inlet of the compressor; the secondary refrigeration module comprises the secondary condenser, a secondary evaporator, and another compressor, an outlet of said another compressor of the secondary refrigeration module is connected to an inlet of the secondary condenser; an outlet of the secondary condenser is connected to an inlet of the secondary evaporator via another expansion valve; an outlet of the secondary evaporator is connected to an inlet of said another compressor.

A first heat exchanger and a second heat exchanger of the at least two heat exchangers of the auxiliary heat exchange assembly are mounted to a hot side of a first regenerator provided for a first refrigerant module of the two refrigerant modules and a hot side of a second regenerator provided for a second refrigerant module of the two refrigerant modules respectively.

In the first refrigerant module of the two refrigerant modules, the air inlet pipe of the air module provided for the first refrigerant module is connected to the first heat exchanger and the hot side of the first regenerator through an air filter, and the hot side of the first regenerator is connected to the primary evaporator and the secondary evaporator of the first refrigerant module via air ducts, said primary evaporator and secondary evaporator are in turns connected to a cold side of the first regenerator via air ducts, and the cold side of the first regenerator is connected to the secondary condenser through air ducts, and air coming out from the secondary condenser is led to an air outlet port; the air outlet port is provided with a blower.

In the second refrigerant module of the two refrigerant modules, the air inlet pipe of the air module provided for the second refrigerant module is connected to the second heat exchanger and the hot side of the second regenerator through another air filter; the hot side of the second regenerator is connected to the primary evaporator and the secondary evaporator of the second refrigerant module via air ducts;

the primary evaporator and the secondary evaporator of the second refrigerant module are in turns connected to a cold side of the second regenerator; the cold side of the second regenerator is connected to the secondary condenser of the second refrigerant module; air coming out from the secondary condenser of the second refrigerant module is led to another air outlet port; said another air outlet port of the second refrigerant module is provided with another blower.

Each primary condenser is an air condenser; cooling fans are provided on the air condenser for heat dissipation.

A refrigerant inlet and a refrigerant outlet are disposed on the circulation loop; the refrigerant inlet is connected with a cooling water pipe; the refrigerant outlet is connected with a cooling water discharge pipe.

A heat exchanging device is connected between each said compressor and the corresponding evaporator.

A filter is disposed between each heat exchanging device and the corresponding expansion valve.

The two sets of dehumidifying heat pump assemblies are disposed inside an insulated housing, and are respectively located at two sides of the insulated housing; an air mixing chamber and a drying chamber separated by a partition are disposed inside the insulated housing.

Air filters corresponding to the respective dehumidifying heat pump assemblies are disposed on the insulated casing; an upper filter is disposed on each of the air filters.

The first regenerator and the second regenerator are disposed in the middle of the insulated housing; the air mixing chamber is defined between the first regenerator and the second regenerator; the primary evaporators and the secondary evaporators of the first refrigerant module and the second refrigerant module are respectively provided on each of two sides of a lower portion of the air mixing chamber.

Compared with the prior art, the present invention has the following advantages: the present invention increases dehumidification volume by more than 10%; the present invention achieves a sealed drying process where there is no leakage of bad smells during the sludge drying process, and therefore it is not necessary to provide a deodorizing device; by separating circulation air volume and dehumidification air volume, sludge drying cycle can be shortened and dried dust of sludge can be prevented; the external structure of the cooling fans and the blower (dehumidification blower) can meet the modular structural design requirements for sludge drying, and reduce the volume of the main structure of the dehumidifying heat pump. The system has compact structure, small floor space, small maintenance space, and a maintenance space that requires accessibility only from a front side, which can fully meet the modular structural requirements for sludge dryer.

BRIEF DESCRIPTION OF THE DRAWINGS

FIG. 6 shows the flow of primary refrigerant in the primary refrigeration module of the second refrigerant module.

FIG. 7 shows the flow of secondary refrigerant in the secondary refrigeration module of the second refrigerant module.

FIG. 8 shows the flow of cooling water from cooling tower or other cooling sources.

DETAILED DESCRIPTION OF THE INVENTION

The present invention will be further described in detail below with reference to the accompanying drawings and an embodiment.

Figure 1:
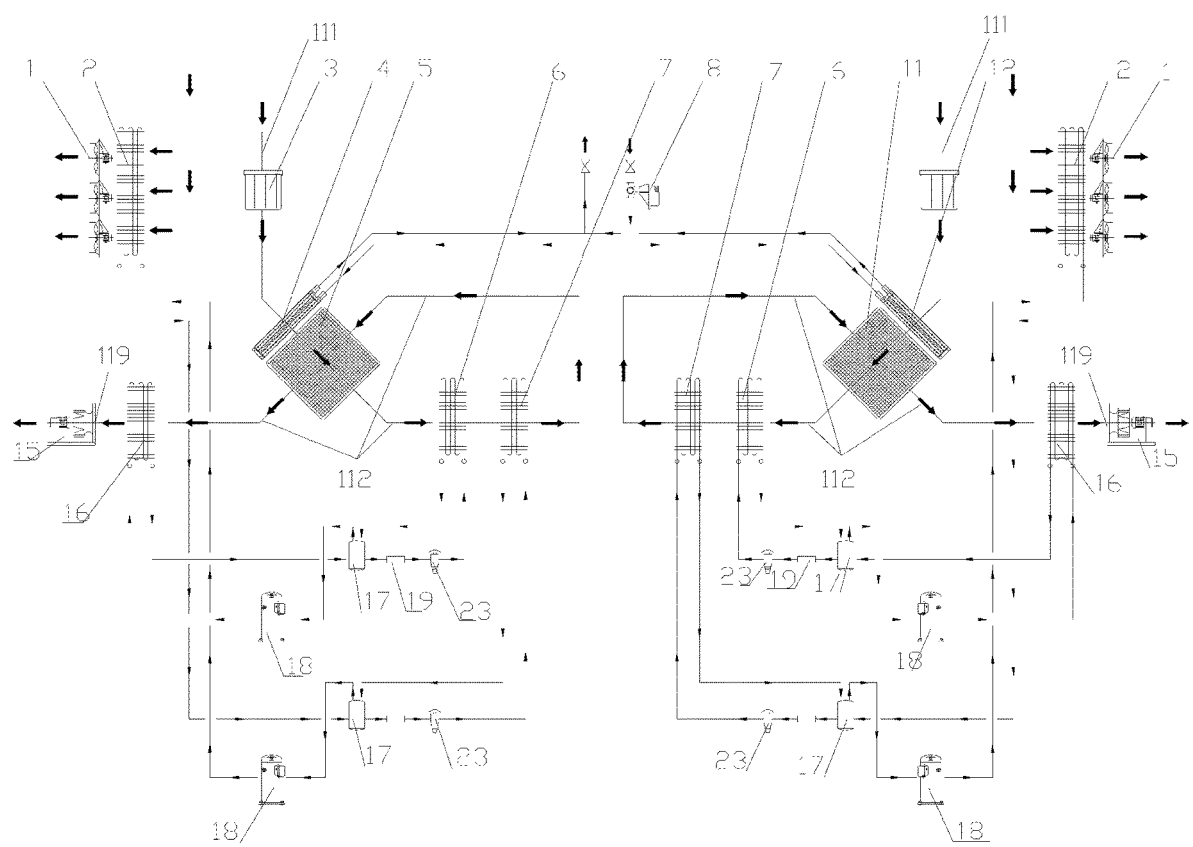
FIG. 1 is a flow diagram illustrating the principle of the temperature-adjustable four-effect dehumidifying and drying system according to the present invention.
Figure 2:
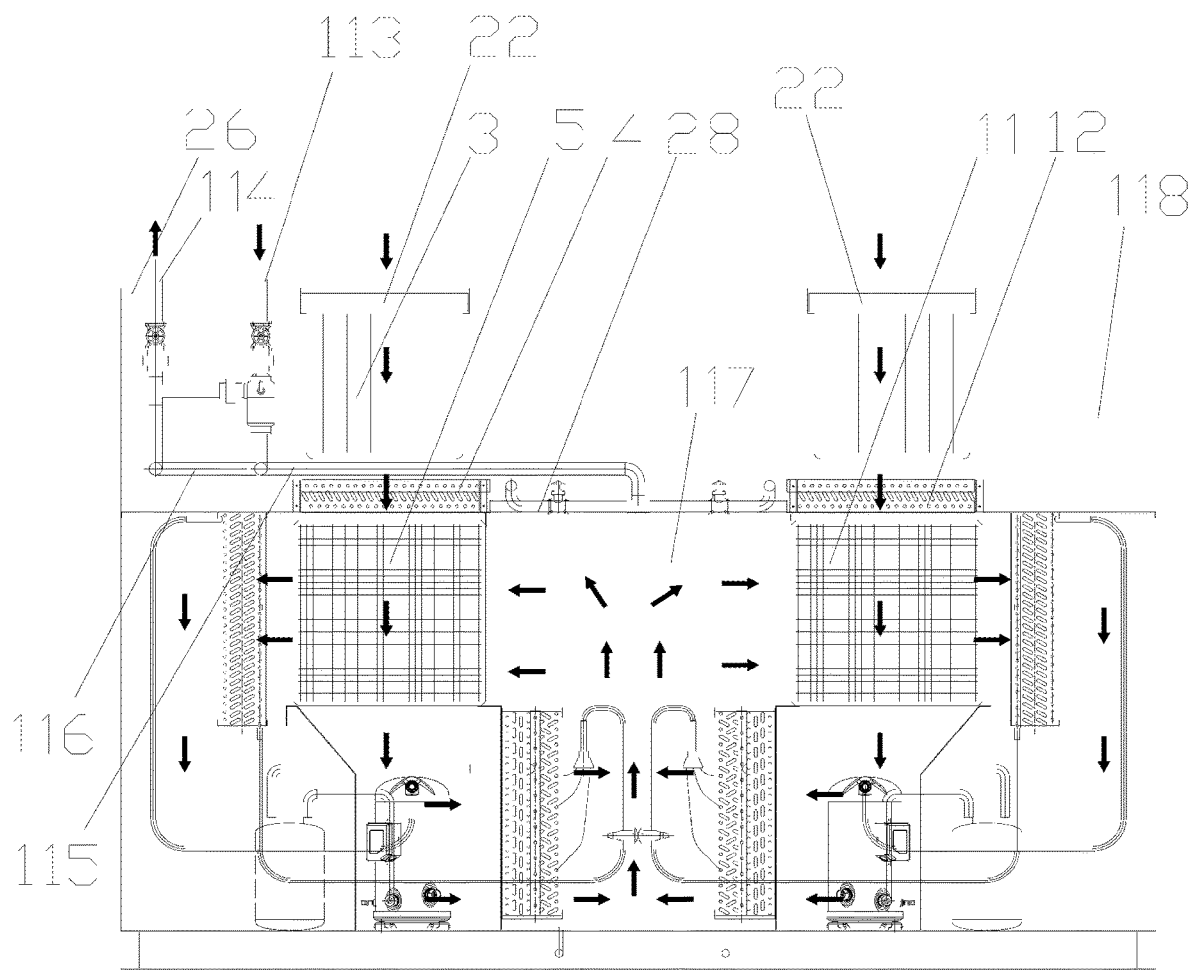
FIG. 2 is a first diagram illustrating the air flow of the temperature-adjustable four-effect dehumidifying and drying system according to the present invention.
Figure 3:
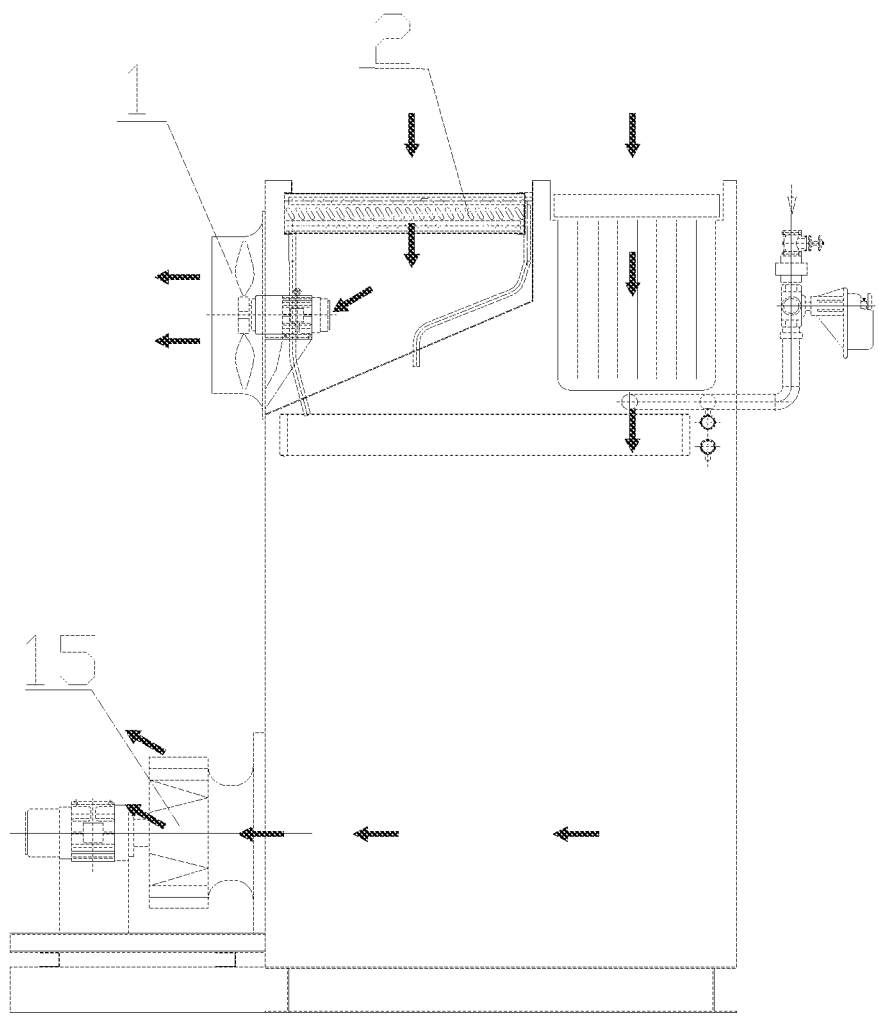
FIG. 3 is a second diagram illustrating the air flow of the temperature-adjustable four-effect dehumidifying and drying system according to the present invention.

As shown in FIGS. 1-3, the temperature-adjustable four-effect dehumidifying and drying system comprises at least two sets of dehumidifying heat pump assemblies and a set of auxiliary heat exchange assembly; the auxiliary heat exchange assembly is formed by at least two heat exchangers (a first heat exchanger 4, and a second heat exchanger 12) connected via pipes defining a circulation loop; a refrigerant inlet 113 and a refrigerant outlet 114 are disposed on the circulation loop; an electric proportional valve 8 is provided on the refrigerant inlet 113; a control valve is disposed at each of the refrigerant inlet 113 and the refrigerant outlet 114. The dehumidifying heat pump assemblies comprise two refrigerant modules and an air module, each of the two refrigerant modules comprises a primary refrigeration module and a secondary refrigeration module; the primary refrigeration module comprises a primary condenser 2, a primary evaporator 7 and a compressor 18; an outlet of the compressor 18 is connected to an inlet of the primary condenser 2, and an outlet of the primary condenser 2 is connected to an inlet of the primary evaporator 7 through an expansion valve 23; and an outlet of the primary evaporator 7 is connected to an inlet of the compressor 18; the secondary refrigeration module comprises a secondary condenser 16, a secondary evaporator 6, and also a compressor 18, an outlet of the compressor 18 of the secondary refrigeration module is connected to an inlet of the secondary condenser 16; an outlet of the secondary condenser 16 is connected to an inlet of the secondary evaporator 6 via also an expansion valve 23 in the secondary refrigeration module; an outlet of the secondary evaporator 6 is connected to an inlet of the compressor 18 of the secondary refrigeration module; in a first refrigerant module of the two refrigerant modules, an air inlet pipe 111 of the air module is connected to the first heat exchanger 4 and a hot side of a first regenerator 5 through an air filter 3, and the hot side of the first regenerator 5 is connected to the primary evaporator 7 and the secondary evaporator 6 via ventilation ducts 112, said primary evaporator 7 and secondary evaporator 6 are in turns connected to a cold side of the first regenerator 5 via ventilation ducts 112, and the cold side of the first regenerator 5 is connected to the secondary condenser 16 through ventilation ducts 112, and air coming out from the secondary condenser 16 is led to an air outlet port 119; the air outlet port 119 is provided with a blower 15; a heat exchanging device (energy saver) 17 is connected between the primary evaporator 7 and the compressor 18 of the primary refrigeration module and between the secondary evaporator 6 and the compressor 18 of the secondary refrigeration module respectively. A filter 19 is disposed between each heat exchanging device 17 and the corresponding expansion valve 23.

In a second refrigerant module of the two refrigerant modules, an air inlet pipe 111 of the air module is connected to the second heat exchanger 12 and a hot side of a second regenerator 11 also through an air filter 3 in the second refrigerant module; the hot side of the second regenerator 11 is connected to the primary evaporator 7 and the secondary evaporator 6 of the second refrigerant module via ventilation ducts 112; the primary evaporator 7 and the secondary evaporator 6 of the second refrigerant module are in turns connected to a cold side of the second regenerator 11; the cold side of the second regenerator 11 is connected to the secondary condenser 16 of the second refrigerant module; air coming out from the secondary condenser 16 of the second refrigerant module is led to an air outlet port 119 of the second refrigerant module; the air outlet port 119 of the second refrigerant module is also provided with a blower 15; a heat exchanging device 17 is also connected between the primary evaporator 7 and the compressor 18 of the primary refrigeration module of the second refrigerant module and between the secondary evaporator 6 and the compressor 18 of the secondary refrigeration module of the second refrigerant module respectively. A filter 19 is also disposed between each heat exchanging device 17 and the corresponding expansion valve 23 of the second refrigerant module.

Each primary condenser 2 is an air condenser; cooling fans 1 are provided on the air condenser for heat dissipation. The refrigerant inlet 113 is connected with a cooling water pipe 115; the refrigerant outlet 114 is connected with a cooling water discharge pipe 116. The two sets of dehumidifying heat pump assemblies are disposed inside an insulated housing 26, and are respectively located at two sides of the insulated housing 26; an air mixing chamber 117 and a drying chamber 118 separated by a partition 28 are disposed inside the insulated housing 26. Air filters 3 corresponding to the respective dehumidifying heat pump assemblies are disposed on the insulated casing 26; an upper filter 22 is disposed on each of the air filters 3. Preferably, the first regenerator 5 and the second regenerator 11 are disposed in the middle of the insulated housing 26; an air mixing chamber 117 is defined between first regenerator 5 and the second regenerator 11; the primary evaporators 6 and the secondary evaporators 7 of the first refrigerant module and the second refrigerant module are respectively provided on each of two sides of a lower portion of the air mixing chamber 117. The secondary condensers are respectively located at two sides of a central portion of the insulated casing 26. As said, the air filters 3 corresponding to the respective dehumidifying heat pump assemblies are disposed on the insulated casing 26, and the upper filter 22 is disposed on each of the air filters 3.

Operating Principles:

Explanation of the flow of refrigerants (refrigerants includes inorganic compounds, fluoride pure substances, hydrocarbons or mixed refrigerants)

Figure 4:
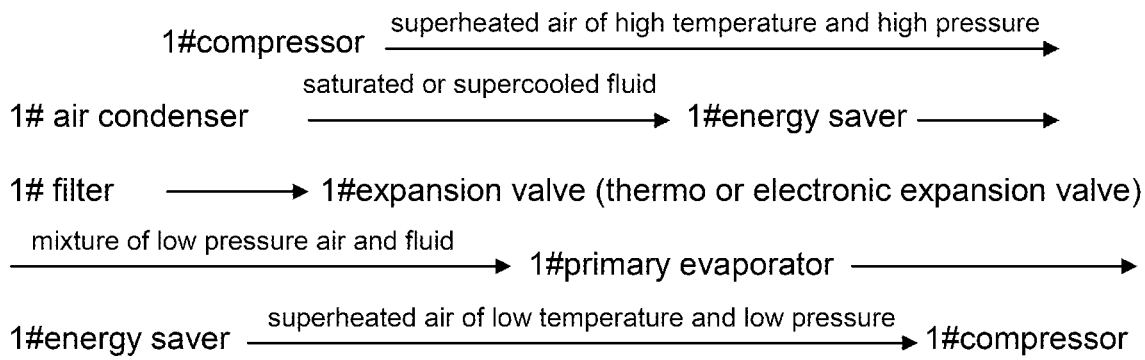
FIG. 4 shows the flow of primary refrigerant in the primary refrigeration module of the first refrigerant module.

2.2.1 1 #(—of First Refrigerant Module) Flow of Primary Refrigerant in the Primary Refrigeration Module The flow of refrigerants of the first refrigerant module, in particular the flow of primary refrigerant in the primary refrigeration module of the first refrigerant module is shown in detail in FIG. 4.

2.2.2 1 # Flow of Secondary Refrigerant in the Secondary Refrigeration Module

Figure 5:
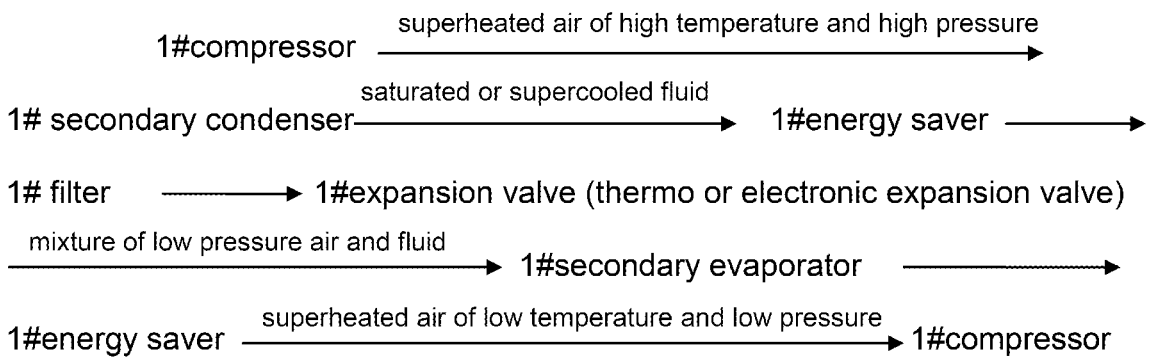
FIG. 5 shows the flow of secondary refrigerant in the secondary refrigeration module of the first refrigerant module.

The flow of refrigerants of the first refrigerant module, in particular the flow of secondary refrigerant in the secondary refrigeration module of the first refrigerant module is shown in detail in FIG. 5.

2.2.3 2 #(—of Second Refrigerant Module) Flow of Primary Refrigerant in the Primary Refrigeration Module The flow of refrigerants of the second refrigerant module, in particular the flow of primary refrigerant in the primary refrigeration module of the second refrigerant module is shown in detail in FIG. 6.

2.2.4 2 # Flow of Secondary Refrigerant in the Secondary Refrigeration Module

The flow of refrigerants of the second refrigerant module, in particular the flow of secondary refrigerant in the secondary refrigeration module of the second refrigerant module is shown in detail in FIG. 7.

Explanation of the Flow of Cooling Water (from Cooling Tower or Other Cooling Sources)

The flow of cooling water from cooling tower or other cooling sources is shown in detail in FIG. 8.

The present invention uses four-effect (four-stage) cooling process to enhance the cooling ability of air, resulting in even lower relative humidity of the air after processing. By using cooling water for cooling, the surface cooler cools the air during the process, and in such cooling process, the air is also dehumidified, thereby increasing the dehumidification volume of the apparatus and reducing the energy consumption by the apparatus. By adjusting the flowing volume of the cooling water, the air temperature can be adjusted, thereby achieving adjustment of different drying temperatures to achieve drying of different types of sludge. By separating circulation air volume and dehumidification air volume, the circulation air volume can be increased to achieve quick drying of high water content sludge. By means of direct discharge to the external environment (cooling), a sealed drying process can be achieved, and there is no leakage of bad smells during the sludge drying process, and therefore it is not necessary to provide a deodorizing device. The external structure of the cooling fans and the blower (dehumidification blower) can meet the modular structural design requirements for sludge drying, and reduce the volume of the main structure of the dehumidifying heat pump. The system has compact structure, small floor space, small maintenance space, and a maintenance space that requires accessibility only from a front side, which can fully meet the modular structural requirements for sludge dryer. On the basis of dehumidification heat pump using existing air regenerative technology and two-stage refrigeration technology (triple-effect dehumidification heat pump), the overall dehumidification performance ratio of the sludge drying dehumidification heat pump is improved by providing four (or more) compressors.

As said, on the basis of dehumidification heat pump using existing air regenerative technology and two-stage refrigeration technology (triple-effect dehumidification heat pump), the overall dehumidification performance ratio of the sludge drying dehumidification heat pump is improved by providing four (or more) compressors.

The insulated housing 26 is provided with an instrument panel to monitor the operating conditions of each component during the process. The instrument panel can display parameters such as drying chamber temperature, humidity, outlet air temperature, power supply indication, compressor operation, fan operation, auxiliary fan operation, command configuration and operation, stop button, fan manual operation, and failure and reset of automatic button etc. A control box is arranged in a bracket and inside an outer casing; the control box can be provided with for example high voltage control devices for compressors, fans and blowers, and control function modules for dehumidification, refrigeration, heating and ventilation.

Each of the regenerators (5, 11) may be a plate-fin type regenerator, that is, a plate-fin type heat exchanging device.

The plate-fin regenerator comprises partition plates, fins, seals, and distributor plates. A fin and a distributor plate are placed between adjacent partition plates to form an interlayer, and all interlayers are stacked and soldered into a one whole piece, and configured with a necessary head support. The fins may be straight fins, serrated fins, porous fins or corrugated fins.

Each of the evaporators is a finned tubular evaporator. The finned tubular evaporator comprises a base pipe and fins; the fins are mounted on the base pipe; the base pipe is made of a copper tube or an internally threaded copper tube; the fins are corrugated sheets of aluminum or copper materials, louvered fins or corrugated-louvered fins. The primary condenser is a finned tubular heat exchanging device; the finned tubular heat exchanging device comprises a base pipe and fins; the fins are mounted on the base pipe; the base pipe is made of a copper tube or an internally threaded copper tube; the fins are corrugated sheets of aluminum or copper materials, louvered fins or corrugated-louvered fins. The bracket of the insulated housing is made of steel profile material, processed sheet metal or aluminum alloy profile material; the outer casing is a composite insulated board with thermal insulation properties, with a thickness of an insulation layer of the outer casing is not less than 25 mm; the outer casing is made of a composite board, with inner layer of the composite board being a hot galvanized steel board, aluminum board or stainless steel board having good corrosion resistance. The partition 28 can be made of a galvanized sheet or an aluminum sheet which is excellent in corrosion resistance. A water receiving tray can be made of corrosion-resistant aluminum or stainless steel board; a condensed water draining pipe can be made of hot galvanized steel board or stainless steel board, and has a water trap design. The primary condenser can also be shell-and-tube type, soldered plate type or sleeve tube type, and its corrosion resistance is a factor to be considered in the process of water flow.

The description above illustrates only a more preferred embodiment of the present invention, and therefore should not limit the scope of the present invention. Obvious changes or modifications that achieve the same technical effect based on the teachings of the description and the scope of the present invention should also fall within the scope of protection of the present invention.

What is claimed is:

1. A dehumidifying and drying system, comprising at least two sets of dehumidifying heat pump assemblies and a set of auxiliary heat exchange assembly; the at least two sets of dehumidifying heat pump assemblies comprise at least two refrigerant modules and an air module; each of the refrigerant modules comprises condensers, evaporators, and compressors; an outlet of each compressor is connected to an inlet of a corresponding condenser, an outlet of the corresponding condenser is connected to an inlet of a corresponding evaporator via a corresponding expansion valve, and an outlet of the corresponding evaporator is connected to said compressor; the auxiliary heat exchange assembly is formed by at least two heat exchangers connected via pipes defining a circulation loop; the air module comprises an air inlet pipe and a regenerator for each of the at least two refrigerant modules; in each refrigerant module, the corresponding air inlet pipe is connected to a hot side of the corresponding regenerator through a corresponding heat exchanger of the auxiliary heat exchange assembly, the hot side of the corresponding regenerator is connected with the evaporators of the corresponding refrigerant module via ventilation ducts, and the evaporators of the corresponding refrigerant module are also connected to a cold side of the corresponding regenerator via ventilation ducts; the cold side of the corresponding regenerator is also connected with a secondary condenser of the condensers of the corresponding refrigerant module via ventilation ducts.

2. The dehumidifying and drying system of claim 1, wherein the dehumidifying heat pump assemblies comprise two refrigerant modules and the air module, each of the two refrigerant modules comprises a primary refrigeration module and a secondary refrigeration module; the primary refrigeration module comprises a primary condenser, a primary evaporator and a compressor; an outlet of the compressor is connected to an inlet of the primary condenser, and an outlet of the primary condenser is connected to an inlet of the primary evaporator through an expansion valve; and an outlet of the primary evaporator is connected to an inlet of the compressor; the secondary refrigeration module comprises the secondary condenser, a secondary evaporator, and another compressor, an outlet of said another compressor of the secondary refrigeration module is connected to an inlet of the secondary condenser, an outlet of the secondary condenser is connected to an inlet of the secondary evaporator via another expansion valve; an outlet of the secondary evaporator is connected to an inlet of said another compressor.

3. The dehumidifying and drying system of claim 2, wherein a first heat exchanger and a second heat exchanger of the at least two heat exchangers of the auxiliary heat exchange assembly are mounted to a hot side of a first regenerator provided for a first refrigerant module of the two refrigerant modules and a hot side of a second regenerator provided for a second refrigerant module of the two refrigerant modules respectively.

4. The dehumidifying and drying system of claim 3, wherein in the first refrigerant module of the two refrigerant modules, the air inlet pipe of the air module provided for the first refrigerant module is connected to the first heat exchanger and the hot side of the first regenerator through an air filter, and the hot side of the first regenerator is connected to the primary evaporator and the secondary evaporator of the first refrigerant module via air ducts, said primary evaporator and secondary evaporator are in turns connected to a cold side of the first regenerator via air ducts, and the cold side of the first regenerator is connected to the secondary condenser through air ducts, and air coming out from the secondary condenser is led to an air outlet port; the air outlet port is provided with a blower.

5. The dehumidifying and drying system of claim 4, wherein in the second refrigerant module of the two refrigerant modules, the air inlet pipe of the air module provided for the second refrigerant module is connected to the second heat exchanger and the hot side of the second regenerator through another air filter; the hot side of the second regenerator is connected to the primary evaporator and the secondary evaporator of the second refrigerant module via air ducts; the primary evaporator and the secondary evaporator of the second refrigerant module are in turns connected to a cold side of the second regenerator; the cold side of the second regenerator is connected to the secondary condenser of the second refrigerant module; air coming out from the secondary condenser of the second refrigerant module is led to another air outlet port; said another air outlet port of the second refrigerant module is provided with another blower.

6. The dehumidifying and drying system of claim 5, wherein each primary condenser is an air condenser; cooling fans are provided on the air condenser for heat dissipation.

7. The dehumidifying and drying system of claim 1, wherein a refrigerant inlet and a refrigerant outlet are disposed on the circulation loop; the refrigerant inlet is connected with a cooling water pipe; the refrigerant outlet is connected with a cooling water discharge pipe.

8. The dehumidifying and drying system of claim 1, wherein a heat exchanging device is connected between each said compressor and the corresponding evaporator.

9. The dehumidifying and drying system of claim 8, wherein a filter is disposed between each heat exchanging device and the corresponding expansion valve.

10. The dehumidifying and drying system of claim 1, wherein the two sets of dehumidifying heat pump assemblies are disposed inside an insulated housing, and are respectively located at two sides of the insulated housing; an air mixing chamber and a drying chamber separated by a partition are disposed inside the insulated housing.

* * * * *